United States Patent [19]

Herrmann et al.

[11] Patent Number: 5,723,705
[45] Date of Patent: Mar. 3, 1998

US005723705A

[54] PROCESS FOR THE PREPARATION OF POLYOLEFIN WAXES IN THE PRESENCE OF A METALLOCENE CATALYST AND A CO-CATALYST

[75] Inventors: Hans-Friedrich Herrmann, Darmstadt; Ludwig Böhm, Hattersheim/Ts; Hartmut Voigt, Königstein/Ts; Walter Spaleck, Liederbach; Gerd Hohner, Gersthofen, all of Germany

[73] Assignee: Hoechst Aktiengesellschaft, Frankfurt, Germany

[21] Appl. No.: 478,359

[22] Filed: Jun. 7, 1995

Related U.S. Application Data

[63] Continuation of Ser. No. 66,578, May 26, 1993, abandoned.

[30] Foreign Application Priority Data

May 26, 1992 [DE] Germany .............. 42 17 378.7

[51] Int. Cl.$^6$ ............................................. C10L 1/16
[52] U.S. Cl. .................. 585/9; 585/512; 585/946
[58] Field of Search .................. 585/10, 12, 18, 585/512, 946, 9; 526/153, 162

[56] References Cited

U.S. PATENT DOCUMENTS

| | | |
|---|---|---|
| 3,951,935 | 4/1976 | Engelmann . |
| 4,754,007 | 6/1988 | Pullukat et al. ............ 526/130 |
| 4,962,248 | 10/1990 | Winter et al. . |
| 4,962,262 | 10/1990 | Winter et al. . |
| 5,023,388 | 6/1991 | Lüker . |

FOREIGN PATENT DOCUMENTS

| | | |
|---|---|---|
| 625 142 | 7/1992 | Australia . |
| 2033805 | 8/1991 | Canada . |
| 0 161 060 | 11/1985 | European Pat. Off. . |
| 0 321 851 | 12/1988 | European Pat. Off. . |
| 0 321 852 | 12/1988 | European Pat. Off. . |
| 416 566 | 3/1991 | European Pat. Off. . |
| 442 300 | 8/1991 | European Pat. Off. . |
| 1 520 609 | 8/1969 | Germany . |
| 4134088 | 4/1993 | Germany . |
| 1 311 013 | 3/1973 | United Kingdom . |

OTHER PUBLICATIONS

European Search Report, No. 93108106.1, May 18, 1994.

*Primary Examiner*—Gary P. Straub
*Assistant Examiner*—Thomas G. Dunn, Jr.
*Attorney, Agent, or Firm*—Connolly & Hutz

[57] ABSTRACT

A process for the preparation of a polyolefin wax by polymerization or co-polymerization of olefines or diolefins at a temperature of −40° to 100° C. at a pressure of 0.5 to 120 bar, in suspension and in the presence of a metallocene catalyst and a co-catalyst, thereby producing wax products in solid form which may be easily separated from the suspending agent and the catalyst need not be separated off.

12 Claims, No Drawings

PROCESS FOR THE PREPARATION OF POLYOLEFIN WAXES IN THE PRESENCE OF A METALLOCENE CATALYST AND A CO-CATALYST

This application is a continuation of 08/066,578, filed May 26, 1993, now abandoned.

SUMMARY OF THE INVENTION

The present invention relates to a process for the preparation of polyolefin waxes having a low residual ash content.

Polyolefin waxes, in particular polyethylene waxes, are of importance for many fields of application. In particular, highly crystalline waxes are of increasing interest as a mixture component of abrasion-resistant printing inks, for the matting of paints and coatings and for the preparation of emulsifiable waxes for cleaning powders.

DESCRIPTION OF THE PRIOR ART

The preparation of waxes at a temperature below 100° C. using metallocene catalysts in a suspension process is known (see U.S. Pat. No. 5,023,388; U.S. Pat. No. 4,962,262; U.S. Pat. No. 4,962,248; U.S. Pat. No. 5,081,322; EP 416 566 and DE 4,134,088). One problem of the known processes, in particular in the preparation of ethylene copolymer waxes, is the solubility or swelling of the products prepared in the suspending agent. All conventionally used suspending agents, such as hexane, octane or diesel oils which are free of aromatics dissolve substantial amounts of wax at temperatures as low as 50°–90° C. and are capable of dissolving waxes completely above 120°.

The preparation of waxes in a solution process using a supported titanium/magnesium catalyst at a temperature of 100° to 160° C. is also known (see U.S. Pat. No. 3,951,935). However, removal of the high-boiling solvents from the product is complicated and results in high costs. In the temperature range from 50° to 90° C., these catalysts, in order to regulate the molecular weight of the polymer, require a very high hydrogen partial pressure, which reduces the polymerization activity very significantly.

DETAILED DESCRIPTION OF THE INVENTION

Accordingly, the object was to find a process in which the wax products are obtained in solid form and can be easily separated off from the suspending agent and a catalyst for this process which has high sensitivity to hydrogen and high activity, so that the catalyst does not have to be separated off.

It has been found that polyolefin waxes ere insoluble in liquid propane at temperatures of up to 80° C. Furthermore, it has been found that polymerization using highly active metallocene catalysts is possible in liquid propane.

Accordingly, the invention relates to a process for the preparation of a polyolefin wax by polymerization or copolymerization of olefins or diolefins at a temperature of −40° to 100° C., at a pressure of 0.5 to 120 bar, in suspension and in the presence of a catalyst comprising a metallocene and a co-catalyst, wherein the metallocene is a compound of the formula I

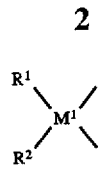

in which $M^1$ is a metal from group IVb, Vb or VIb of the Periodic Table, $R^1$ and $R^2$ are identical or different and are a hydrogen atom, a $C_1$–$C_{10}$-alkyl group, a $C_1$–$C_{10}$-alkoxygroup, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a arylalkenyl group or a halogen atom. $R^3$ and $R^4$ are identical or different and are a mono- or polynuclear hydrocarbon radical capable of forming a sandwich structure with the central atom $M^1$, or one of the radicals $R^3$ and $R^4$ is a substituted nitrogen atom, end low-boiling hydrocarbons having 3 or 4 carbon atoms or low-boiling halogenated hydrocarbons serve as suspending agents.

The catalyst to be used for the process according to the invention comprises a metallocene (component A) and a co-catalyst (component B). The metallocene is a compound of the formula I

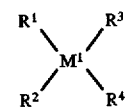

This formula also includes compounds of the formula Ia

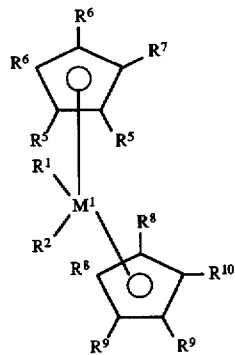

of the formula Ib

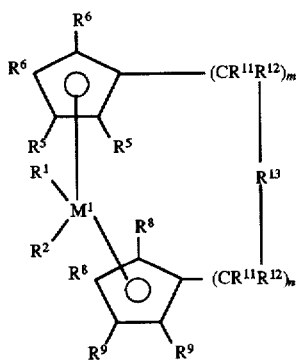

and of the formula Ic

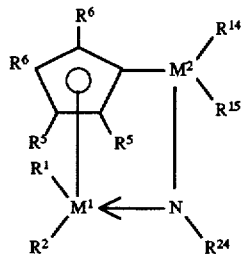 (Ic)

In formulae I, Ia, Ib and Ic, $M^1$ is a metal from the group IVb, Vb or VIb of the Periodic Table, for example titanium, zirconium, hafnium, vanadium, niobium, tantalum, chromium, molybdenum, tungsten, preferably zirconium and hafnium.

$R^1$ and $R^2$ are identical or different and are a hydrogen atom, a $C_1-C_{10}$-, preferably $C_1-C_3$-alkyl group, a $C_1-C_{10}$-, preferably $C_1-C_3$-alkoxy group, a $C_6-C_{10}$-, preferably $C_6-C_8$-aryl group, a $C_6-C_{10}$-, preferably $C_6-C_8$-aryloxy group, a $C_2-C_{10}$-, preferably $C_2-C_4$-alkenyl group, a $C_7-C_{40}$-, preferably $C_7-C_{10}$-arylalkyl group, a $C_7-C_{40}$-, preferably $C_7-C_{12}$-alkylaryl group, a $C_8-C_{40}$-, preferably $C_8-C_{12}$-aryl-alkenyl group or a halogen atom, preferably chlorine or methyl.

$R^3$ and $R^4$ are identical or different and are a mono- or polynuclear hydrocarbon radical capable of forming a sandwich structure with the central atom $M^1$. $R^3$ and $R^4$ are preferably cyclopentadienyl, indenyl, benzoindenyl or fluorenyl, it being possible for the basic structures to carry additional substituents or to be bridged with one another. Furthermore, one of the radicals $R^3$ and $R^4$ can be a substituted nitrogen atom, $R^{24}$ having the meaning of $R^{17}$ and being preferably methyl, t-butyl or cyclohexyl. $R^5$, $R^5$, $R^7$, $R^8$, $R^9$ and $R^{10}$ are identical or different and are a hydrogen atom, a halogen atom, preferably a fluorine, chlorine or bromine atom, a $C_1-C_{10}$-, preferably $C_2-C_4$-alkyl group, a $C_6-C_{10}$-, preferably $C_6-C_8$-aryl group, a $C_1-C_{10}$-, preferably $C_1-C_3$-alkoxy group, an $-NR^{16}_2$, $-SR^{16}$, $-OSiR^{15}_3$, $-SiR^{16}_3$ or $-PR^{16}_2$ radical, in which $R^{16}$ is a $C_1-C_{10}$-, preferably $C_1-C_3$-alkyl group or $C_6-C_{10}$-, preferably $C_6-C_8$-aryl group, or, in the case of Si- or P-containing radicals, is also a halogen atom, preferably a chlorine atom, or any two adjacent radicals $R^5$, $R^6$, $R^7$, $R^8$, $R^9$ or $R^{10}$ together with the carbon atoms linking them form a ring. Particularly preferred ligands are the substituted compounds of the basic structures indenyl, fluorenyl and cyclopentadienyl. $R^{13}$ is

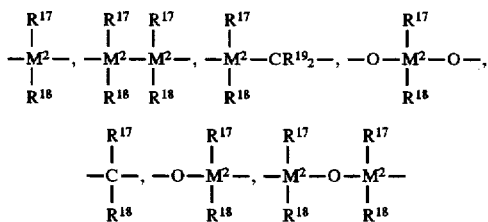

$=BR^{17}$, $-AlR^{17}$, $-Ge-$, $-Sn-$, $-O-$, $-S-$, $=SO$, $=SO_2$, $=NR^{17}$, $=CO$, $=PR^{17}$ or $=P(O)R^{17}$, in which $R^{17}$, $R^{18}$ and $R^{19}$ are identical or different and are a hydrogen atom, a halogen atom, a $C_1-C_{30}$-, preferably $C_1-C_4$-alkyl group, in particular a methyl group, a $C_1-C_{10}$-fluoroalkyl group, preferably a $CF_3$ group, a $C_6-C_{10}$-fluoroaryl group, preferably a penta-fluorophenyl group, a $C_6-C_{10}$-, preferably $C_6-C_8$-aryl group, a $C_1-C_{10}$-, preferably $C_1-C_4$-alkoxy group, in particular a methoxy group, a $C_2-C_{10}$-, preferably $C_2-C_4$-alkenyl group, a $C_7-C_{40}$-, preferably $C_7-C_{10}$-arylalkyl group, a $C_8-C_{40}$-, preferably $C_8-C_{12}$-arylalkenyl group or a $C_7-C_{40}$-, preferably $C_7-C_{12}$-alkylaryl group, or $R^{17}$ and $R^{18}$ or $R^{17}$ and $R^{19}$ in each case together with the atoms linking them form a ring.

$M^2$ is silicon, germanium or tin, preferably silicon and germanium. $R^{13}$ is preferably $=CR^{17}R^{18}=SiR^{17}R^{18}$, $=GeR^{17}R^{18}$, $-O-$, $-S-$, $=SO$, $=PR^{17}$ or $=P(O)R^{17}$.

$R^{11}$ and $R^{12}$ are identical or different and have the meaning given for $R^{17}$, m and n are identical or different and are zero, 1 or 2, preferably zero or 1, m plus n being zero, 1 or 2, preferably zero or 1.

$R^{14}$ and $R^{15}$ have the meaning of $R^{17}$ and $R^{18}$.

The metallocenes described above can be prepared by the following general reaction scheme:

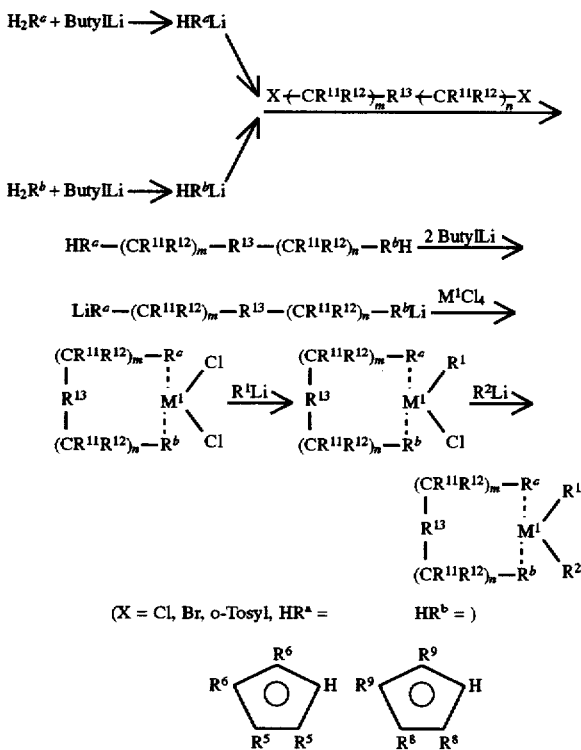

The metallocene is a substituted or unsubstituted cyclo pentadienyl complex of titanium, zirconium or hafnium, preferably of zirconium or hafnium. Examples of preferably suitable metallocenes are:

bis(cyclopentadienyl)zirconium dichloride, bis(methylcyclopentadienyl)zirconium dichloride, bis(butylcyclopentadienyl)zirconium dichloride, bis(alkylcyclopentadienyl)zirconium dichloride, bis(1,2-dimethylcyclopentadienyl)zirconium dichloride, bis(1,3-dimethylcyclopentadienyl)zirconium dichloride, bis(1,2,4-trimethylcyclopentadienyl)zirconium dichloride, bis(1,2,3-trimethylcyclopentadienyl)zirconium dichloride, bis(indenyl)zirconium dichloride, bis(1-methylindenyl)zirconium dichloride, bis(2-methylindenyl)zirconium dichloride, bis(4-methylindenyl)zirconium dichloride, bis(5-methylindenyl)zirconium dichloride, bis(2-methyl-4,6-di-i-propylindenyl)zirconium dichloride, bis(alkylindenyl)zirconium dichloride, bis(cyclopentadienyl)dimethylzirconium, bis(cyclopentadienyl)dibenzylzirconium, and further preferred metallocenes are:

dialkylsilylbis(indenyl)zirconium dichloride, alkylalkylenebis(indenyl)zirconium dichloride, alkylenebis(indenyl)zirconium dichloride, diarylalkylenebis(indenyl)zirconium dichloride, alkylenebis(indenyl)hafnium dichloride, diarylsilylbis(indenyl)zirconium dichloride, (aryl)(alkyl)bis(indenyl)zirconium dichloride, dialkylgermylbis(indenyl)zirconium dichloride, (alkyl)(alkenyl)silylbis(indenyl)zirconium dichloride, (aryl)(alkenyl)silylbis(indenyl)zirconium dichloride, dimethylsilylbis(indenyl)zirconium dichloride, ethylenebis(indenyl)zirconium dichloride, diphenylsilylbis(indenyl)zirconium dichloride, dimethylgermylbis(indenyl)zirconium dichloride, bis(pentamethylcyclopentadienyl)zirconium dichloride, dimethylsilylbis(1-tetrahydroindenyl)zirconium dichloride, ethylenebis(1-tetrahydroindenyl)zirconium dichloride, dimethylsilylbis-1-(2-methyltetrahydroindenyl)zirconium dichloride, ethylenebis-1-(2-methyltetrahydroindenyl)zirconium dichloride, dimethylsilylbis-1-(2,3,5-trimethylcyclopentadienyl)-zirconium dichloride, dimethylsilylbis-1-(2,4-dimethylcyclopentadienyl)-zirconium dichloride, ethylenebis(1-indenyl)zirconium dichloride, dimethylsilylbis(1-indenyl)zirconium dichloride, diphenylsilylbis(1-indenyl)zirconium dichloride, dimethylsilylbis(1-indenyl)dimethylzirconium, dimethylsilylbis-1-(2-methylindenyl)zirconium dichloride, phenylmethylsilylbis-1-(2-methylindenyl)zirconium dichloride, dimethylsilylbis-1-(2-methyl-4-ethylindenyl)zirconium dichloride, dimethylsilylbis-1-(2-methyl-4-i-propylindenyl)zirconium dichloride, ethylenebis-1-(4,7-dimethylindenyl)zirconium dichloride, and other usable metallocenes are:

diphenylmethylene(9-fluorenyl)(cyclopentadienyl)zirconium dichloride, dimethylsilyl(9-fluorenyl)(cyclopentadienyl)zirconium dichloride, isopropylidene(9-fluorenyl)(cyclopentadienyl)zirconium dichloride, isopropylidene(1-indenyl)(cyclopentadienyl)zirconium dichloride.

Ethylenebis(indenyl)zirconium dichloride, bis(indenyl)zirconium dichloride, dimethylsilylbis(indenyl)zirconium dichloride, bis(cyclopentadienyl)dimethylzirconium, bis(methylcyclopentadienyl)zirconium dichloride, bis(butylcyclopentadienyl)zirconium dichloride and bis(cyclopentadienyl)zirconium dichloride are particularly preferably used.

In principle, any compound which, owing to its Lewis acidity, is capable of converting the neutral metallocene into a cation and stabilizing it ("labile coordination") is suitable as the co-catalyst. Apart from this, the co-catalyst or the anion resulting therefrom should not undergo any further reactions with the metallocene cation.

The co-catalyst (=component B) of the catalyst to be used according to the invention is preferably an aluminoxane or another organoaluminum compound. The aluminoxane is a compound of the formula IIa for the linear type and/or formula IIb for the cyclic type

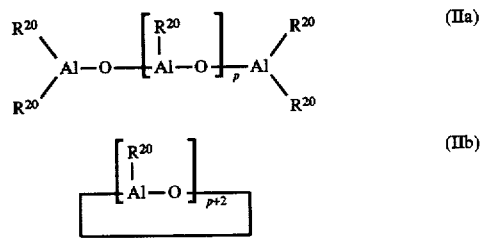

In these formulae, $R^{20}$ is a $C_1$–$C_6$-alkyl group, preferably methyl, ethyl, n-butyl or isobutyl, in particular methyl or butyl, and p is an integer from 4 to 30, preferably 10 to 20, it also being possible for radicals $R^{20}$ to be different. Particular preference is given to methyl aluminoxane and methylbutyl aluminoxane having a methyl/-butyl ratio of 100:1 to 1:1, butyl being understood to mean n-butyl or i-butyl or n-butyl-butyl mixtures and the radicals having any desired, preferably random, distribution.

The aluminoxane can be prepared in various ways.

One possibility is to carefully add water to a dilute solution of a trialkylaluminum or a mixture of various trialkylaluminums by reacting the solution of the trialkylaluminum, preferably trimethylaluminum, with small portions of water. This is preferably done with cooling and vigorous mixing, for example by means of a high-speed stirrer. The insoluble aluminoxanes formed in such a reaction can also be used as catalyst component B.

A further possibility is to prepare supported aluminoxanes by, for example, suspending the support material under inert conditions in the solution of at least one alkyl aluminum and hydrolyzing this suspension with water.

The support material is a silica or alumina which can additionally contain one or more other oxides of the elements Al, K, Mg, Na, Si, Ti, Zr and/or whose surface may have been made hydrophobic by reaction with alkyl-silanes, alkylhalosilanes, alkoxysilanes, silazanes or other alkyl compounds. Before use, the support material can be freed from adsorbed water and oxygen in vacuo, in an oven, in a heated fluid bed or by another method. The support material thus pretreated has a residual water content of less than 3% by weight, which can be removed by calcining at 1000° C. for 2 hours.

To prepare a supported aluminoxane, the support material is stirred, under inert conditions, into a solution of at least one alkylaluminum of the formula $ALR^{21}_3$, in which $R^{21}$ is a $C_1$–$C_6$-alkyl group, a $C_1$–$C_6$-fluoroalkyl group, a $C_6$–$C_{18}$-aryl group, a $C_8$–$C_{18}$-fluoroaryl group or a hydrogen atom, preferably methyl, ethyl, i-propyl, n-butyl, i-butyl, and suspended by stirring or the like. The support material is used in an amount of less than 100 g, preferably less than 50 g, per mole of alkylaluminum. The amount of solvent is selected in such a manner that up to 20% by weight, preferably up to 10% by weight, of support material are suspended. For this purpose, apart from the known aromatic solvents such as toluene, aliphatic solvents such as pentane, hexane, heptane, n-decane or diesel oils which are free of aromatics (boiling points in the range from 60° C. to 300° C.) can also be used.

Water or solutions, mixtures or emulsions of water in other solvents are carefully added to the suspension of the support material at a temperature of –20°C. to +60° C. with cooling and vigorous mixing, the amount of water being metered in continuously or batchwise in small portions. The overall amount of water is 50 to 100 mol %, preferably 50 to 80 mol %, relative to one mole of aluminum of the initially introduced alkylaluminum compound.

In a different method, finely powdered copper sulfate pentahydrate is slurried in toluene, and trialkylaluminum is added to this slurry in a glass flask under inert gas at about −20° C. in such an amount that for every 4 g-atoms of Al about 1 mol of $CuSO_4 \times 5H_2O$ is available. After slow hydrolysis with elimination of alkane, the reaction mixture is left at room temperature for 24 to 48 hours, during which it may be necessary to cool it in order to prevent the temperature from rising above 30° C. The aluminoxane dissolved in toluene is then filtered off from the copper sulfate, and the toluene is distilled off in vacuo.

Furthermore, aluminoxanes are obtained by reacting trialkylaluminum dissolved in an inert aliphatic or aromatic solvent with aluminum salts containing water of crystallization. Heptane and toluene and aluminum sulfate are preferred. The volume ratio between the solvent and the alkylaluminum used is 1:1 to 50:1, preferably 5:1 and the reaction time which can be controlled by elimination of the alkane is 1 to 200 hours, preferably 10 to 40 hours.

Of the aluminum salts containing water of crystallization, in particular those are used which have a high water of crystallization content. Particular preference is given to aluminum sulfate hydrate, in particular to the compounds $Al_2(SO_4)_3 \times 18H_2$ and $Al_2(SO_4)_3 \times 18H_2O$ having a particularly high water of crystallization content of 16 and 18 mol rasp. of $H_2O$/mole of $Al_2(SO_4)_3$.

The following is an example of the preparation of methylaluminoxane 37.1 g of $Al_2(SO_4)_3 \times 18H_2O$ (0.056 mol, which corresponds to 1 mol of $H_2O$) were suspended in 250 cm$^3$ of toluene, 50 cm$^3$ trimethylaluminum (0.52 mol) were added and made to react at 20° C. After a reaction time of 30 hours, about 1 mol of methane have been evolved. The solution was then filtered off from the solid aluminum sulfate. Stripping off of toluene gave 19.7 g of methylaluminoxane. The 10 yield was 63% of theory. The average molecular weight determined in benzene by cryoscopy was 1170. The calculated number of $Al(R^{20})$ —O units was 20.2. Accordingly, the average degree of oligomerization was about 20.

A further variation for preparing aluminoxanes consists in dissolving trialkylaluminum in the suspending agent initially introduced into the polymerization reactor, preferably in the liquid monomer, and then reacting the aluminum compound with water.

Apart from the process described above for the preparation of aluminoxanes, others can be used. Irrespective of the preparation method, the common feature of all aluminoxane solutions is a varying content of unconverted trialkylaluminum, which is present in free form or as an adduct.

The aluminoxane is used either as a solution or as a suspension obtained from the preparation processes described above.

Furthermore, useful organoaluminum compounds are those of the formulae $AlR^{21}_2H$, $AlR^{21}_3$, $AlR^{21}_2Cl$, $Al_2R^{21}_3Cl_3$ and $AlR^{21}Cl_2$, in which $R^{21}$ is a $C_1$–$C_6$-alkyl group, a $C_1$–$C_6$-fluoroalkyl group, a $C_5$–$C_{18}$-aryl group, a $C_6$–$C_{18}$-fluoroaryl group or a hydrogen atom. Examples of $R^{21}$ are methyl, ethyl, i-propyl, n-butyl, i-butyl or n-octyl.

The preparation of the catalyst to be used according to the invention can be effected by reaction of the transition metal compound with the organoaluminum compound by various methods:

1) The organoaluminum compound is brought into contact in a suitable solvent, such as, for example, pentane, hexane, heptane, toluene or dichloromethane, with the transition metal compound at a temperature of −20° to +120° C., preferably at 15° to 40° C., by vigorous mixing, for example by stirring. The Al/$M^1$ molar ratio is 1:1 to 10000:1, preferably 10:1 to 2000:1, and the reaction time is 5 to 120 minutes, preferably 10 to 30 minutes, at an aluminum concentration of greater than 0.01 mol/dm$^3$, preferably greater than 0.5 mol/dm$^3$ under inert gas.

2) An insoluble or supported aluminoxane is reacted as a suspension containing 1 to 40% by weight, preferably 5 to 20% by weight, of aluminoxane in an aliphatic, inert suspending agent, such as n-decane, hexane, heptane or diesel oil with the finely ground transition metal compound or its solution in an inert solvent, such as toluene, hexane, heptane or dichloromethane, in an Al/$M^1$ molar ratio of 1:1 to 10000:1, preferably 10:1 to 2000:1, at a temperature of −20° to +120° C., preferably 15° to 40° C., during a reaction time of 5 to 120 minutes, preferably 10 to 30 minutes, with vigorous mixing.

During the reaction for the preparation of the catalyst, in particular if metallocenes having absorption maxima in the visible range are used, color changes of the reaction mixture are observed, which make it possible to monitor the progress of the reaction.

The catalyst thus prepared is either used directly for polymerization as a suspension or is separated off by filtration or decanting and washed with an inert suspending agent, such as toluene, n-decane, hexane, heptane, diesel oil, dichloromethane. After this washing, it can be dried in vacuo, resuspended, as a powder or still containing adhering solvent, in an inert suspending agent, such as, for example, toluene, hexane, heptane, diesel oil or dichloromethane, and metered into the polymerization system as a suspension.

The catalyst prepared according to 1) or 2) can also be used in prepolymerized form, or the metallocene can be applied to a support and used in this form. Preferably, one of the olefins to be polymerized is used for prepolymerization. Examples of suitable support materials are silica gel, alumina, solid aluminoxane or other organic or inorganic support materials. A polyolefin support is also suitable.

Compounds of the formulae $R^{22}_xNH_{4-x}BR^{23}_4$, $R^{22}_xPH_{4-x}BR^{23}_4$, $R^{22}_3CBR^{23}_4$ or $BR^{23}_3$ can also be used as co-catalysts instead of the organoaluminum compounds. In these formulae, x is a number from 1 to 4, the radicals $R^{22}$ are identical or different, preferably identical, and are $C_1$–$C_{10}$-alkyl or $C_6$–$C_{18}$-aryl or two radicals $R^{22}$ together with the atom linking them form a ring, and the radicals $R^{23}$ are identical or different, preferably identical, and are $C_6$–$C_{18}$-aryl, which may be substituted by alkyl, haloalkyl or fluorine. In particular, $R^{22}$ is ethyl, propyl, butyl or phenyl and $R^{23}$ is phenyl, pentafluorophenyl, 3,5-bis(trifluoromethyl)phenyl, mesityl, xylyl or tolyl.

These co-catalysts are particularly suitable in combination with metallocenes of the formula I, if $R^1$ and $R^2$ are a $C_1$–$C_{10}$-alkyl group or an aryl or benzyl group, preferably a methyl group. Derivatization to give the metallocenes of the formula I can be carried out by methods known from the literature, for example by reaction with alkylating agents, such as methyllithium, (see Organometallics 9 (1990) 1539; *J. Am. Chem. Soc.* 95 (1973) 6263).

When the abovementioned co-catalysts are used, the actual (active) polymerization catalyst comprises the metallocene reaction product and one of the compounds mentioned. Accordingly, first this reaction product is prepared, preferably outside the polymerization reactor, in a separate step using a suitable solvent, such as, for example, toluene.

The monomers used are linear or branched olefins or diolefins having 2 to 18 carbon atoms. Examples of these are ethylene, propylene, 1-butene, 2-butene, 1-pentene, 1-hexene, 1-octene, 2-methyl-1-propene, 3-methyl-1-butene, 3-methyl-1-pentene, 4-methyl-1-pentene, 4-methyl-1-hexene, styrene, cyclopentene, cyclohexene, 1,3-butadiene, 1,4-pentadiene, 1,4- or 1,5-hexadiene, 1,7-octadiene. Preference is given to the polymerization of ethylene or propylene and the copolymerization of ethylene or propylene with an olefin having 3 to 10 carbon atoms, particularly preferably prepared copolymer waxes being ethylene/propylene waxes, ethylene/1-butene waxes, ethylene/1-hexene waxes and ethylene/propylene/1-butene terpolymer waxes.

The polymerization is carried out batchwise or continuously, in one or more steps, any desired residence times being possible due to the only slight time-dependent decrease in polymerization activity. The temperature is 0° to 100° C., preferably 60° to 80° C. 70 to 100, preferably 80 to 100, % by weight of ethylene or propylene, relative to the total amount of monomers, and 0 to 30, preferably 0 to 20, % by weight of at least one comonomer, relative to the total amount of monomers, are polymerized.

Hydrogen is added as molecular weight regulator, the hydrogen partial pressure being in the range of from 0.05 to 50 bar, preferably 0.1 to 25 bar, in particular 0.2 to 10 bar. The olefin/hydrogen molar ratio is 2 to 200, preferably 4 to 50. Furthermore, it is possible to change the polymerization temperature. Polymers of broad molecular-weight distribution are available by a multi-step process or by using mixtures of more than one catalyst. Moreover, the molecular weight of the polymer obtained in the process according to the invention is determined by the type of the catalyst component A used and by the Al/$M^1$ ratio of the catalyst system.

The total pressure in the polymerization system is 0.5 to 120 bar. The polymerization in the industrially particularly interesting pressure range of from 5 to 64 bar is preferred.

In this reaction, the transition metal component is used in a concentration of $10^{-1}$ to $10^{-7}$, preferably $10^{-4}$ to $10^{-6}$, mole of $M^1$ per $dm^3$ of solvent or per $dm^3$ of reactor volume, relative to the transition metal. The co-catalyst is used in a concentration of $10^{-5}$ to $10^{-1}$ mol, preferably $10^{-4}$ to $10^{-2}$ mol, per $dm^3$ of solvent or per $dm^3$ of reactor volume, relative to the aluminum content. However, in principle, higher concentrations are also possible.

The solvents which serve as suspending agents are low-boiling hydrocarbons having 3 or 4 carbon atoms, such as, for example, propane, i-butane, n-butane, or low-boiling halogenated hydrocarbons, such as, for example, methylene chloride and mixtures thereof with one another and, if desired, with other suspending agents, such as haptane, octane, diesel oils, toluene, or with olefins such as described above. Propane, n-butane or i-butane, in particular propane, are preferably used.

For polymerization, addition of the catalyst can be preceded by addition of another alkylaluminum compound, such as, for example, trimethylaluminum, triethylaluminum, triisobutylaluminum or isoprenylaluminum in a concentration of 1 to 0.001 mmol of Al per kg of reactor content for rendering the polymerization system inert. Moreover, these compounds can also additionally be used for regulating the molecular weight.

The polyolefin wax prepared according to the invention is separated off from the suspending agent and dried.

Polyethylene waxes prepared according to the invention comprise 100 to 80% by weight, relative to the total polymer, of ethylene units and 0 to 20% by weight, relative to the total polymer, of units derived from another olefin, diolefin or another unsaturated hydrocarbon, in particular propylene, 1-butene, 2-butene or 1-hexene. They have a molecular weight $M_w$ of about 500 to about 50000, preferably about 2000 to about 20000. The molecular weight distribution (polydispersity) $M_w/M_n$ is extremely narrow and is about 1 to 10, preferably 1 to 4. The viscosity number of the wax is in the range of from 2 to 100 $cm^3$/g. The melting range of the wax can be adjusted from about 126° to 131° C. for a homopolymer to any desired temperatures down to about 80° to 90° C. by copolymerization.

Polypropylene waxes prepared according to the invention comprise 80 to 100, preferably 90 to 100, % by weight, relative to the total polymer, of propylene units and of 0 to 20, preferably 0 to 10, % by weight, relative to the total polymer, of units derived from ethylene or one of the other olefins described above. They have a molecular weight $M_w$ of 1000 to 50000 g/mol, preferably 8000 to 45000 g/mol, a polydispersity $M_w/M_n$ of 1.8 to 5, preferably 2 to 4, a viscosity number of 2 to 100 $cm^3$/g, preferably 10 to 60 $cm^3$/g, a melting point of 50° to 150° C., preferably 70° to 140° C., a dropping point of 60° to 150° C., preferably 80° to 150° C., a melt viscosity of 100 to 80000 mPas, preferably 120 to 10000 mPas at 170° C. and a random distribution of the comonomer units in the polymer chain.

An advantage of the process according to the invention is that catalyst systems can be used which have very high activity at temperatures of from 0° to 100° C. even when hydrogen is used for regulation. This makes decomposition of the catalyst or purification of the products after the polymerization unnecessary.

Moreover, the process according to the invention makes it possible to use catalyst systems by which products having random comonomer distribution or specific isotactic or syndiotactic sequence lengths or copolymers comprising specific comonomers become accessible in a low-cost process.

A further advantage of the process according to the invention is the ease of removal of residual amounts of the suspending agent which often adhere to the product. When propane is used as the suspending agent, residual amounts can be removed simply by let down to atmospheric pressure.

A further advantage of the process according to the invention is the high sensitivity to hydrogen of the catalyst according to the invention. Compared with other catalyst systems, the hydrogen partial pressure necessary for achieving the polymer molecular weights typical of waxes is lower.

A further essential economic advantage of the process according to the invention is the low hydrogenating effect of the catalysts according to the invention, which leads to an improvement in the polymer yield, relative to the olefins used. As a result, fewer hydrogenated by-products have to be removed from the gas space of the polymerization system.

The examples which follow are intended to illustrate the invention in greater detail.

| | | |
|---|---|---|
| VN | is the viscosity number in $cm^3$/g | |
| $M_w$ | is the weight-average molecular weight | determined by gel permeation chromatography (numbers given in g/mole) |
| $M_n$ | is the number-average molecular weight | |
| $M_w/M_n$ | is the polydispersity | |
| MV | is the melt viscosity determined by a rotating viscometer at 170° C. | |
| BD | is the bulk density of the polymer powder in g/$dm^3$ | |

Melting points, crystallization points, their half-widths, enthalpies of fusion and crystallization and glass-transition temperatures ($T_g$) were determined by DSC measurements (10° C./min of heating/cooling rate).

EXAMPLES

All glass apparatuses were dried by heating in vacuo and flushed with argon or nitrogen. All operations were carried out in Schlenk-type vessels with the exclusion of moisture and oxygen. The solvents used were in each case freshly distilled over an Na/K alloy under argon and stored in Schlenk-type vessels.

The polymer melting points given are taken from a DSC measurement for the 2nd melting (10° C./min). The isotactic index was determined from FT/IR spectra without prior extraction of the sample via the intensity ratio of the bands at 998 cm$^{-1}$ and 972 cm$^{-1}$ in accordance with Dechant, "UR-spektroskopische Untersuchungen von Polymeren" (IR Spectroscopic Analysis of Polymers), Akademie Vlg., Berlin 1972.

For the comparative examples, methylaluminoxane was commercially purchased as a 10% solution in toluene and contained 36 mg of Al/cm$^3$ as determined by aluminum analysis. The average degree of oligomerization n, as determined by freezing point depression in benzene, was 20. Aluminum analysis was carried out by complexometric titration by the method of Schwarzenbach after hydrolysis with water and sulfuric acid.

Example 1

To prepare the catalyst, 5 mg of rac-ethylenebis(indenyl) zirconium dichloride were dissolved in 20 cm$^3$ of methylaluminoxane solution in toluene (corresponding to 27 mmol of Al) and reacted with the methylaluminoxane by standing for 15 minutes. In parallel, a dry 16-dm$^3$ reactor or flushed with nitrogen was filled with 4 kg of propane, and 1.5 bar of hydrogen and 4.5 bar of ethylene were metered in at 30° C. 30 cm$^3$ of the methylaluminoxane solution in toluene were added via a pressure lock, the reactor contents were heated to 70° C. and stirred at 100 rpm. After 20 minutes, polymerization was started at 250 rpm by addition of the catalyst via the pressure lock. The polymerization temperature was controlled at 70° C. by cooling, and the total pressure was kept constant at 31 bar by metered addition of ethylene. After a polymerization time of 1 hour, the reaction was stopped by addition of isopropanol, and the reactor was let down and opened. Drying of the product gave 0.45 kg of free-flowing powder having a VN of 28 cm$^3$/g and a melting point (DSC) of 126° C. The DSC enthalpy of fusion was 241 J/g. Screen analysis gave a $d_{50}$ value of 150 µm. The viscosity of the melt at 140° C. was 1470 mPas.

Example 2

To prepare the catalyst, 6 mg of bis(indenyl)zirconium dichloride were dissolved in 20 cm$^3$ of methylaluminoxane solution in toluene (corresponding to 27 mmol of Al) and reacted with the methylaluminoxane by standing for 15 minutes.

In parallel, a dry 16-dm$^3$ reactor flushed with nitrogen was filled with 4 kg of propane and temperature-controlled at 70° C. At this temperature, 0.5 bar of hydrogen and 30 cm$^3$ of the methylaluminoxane solution in toluene were added via a pressure lock, and the batch was stirred at 100 rpm. The pressure was increased to a total pressure of 31 bar by means of ethylene, and the polymerization was started at 250 rpm by addition of the catalyst via the pressure lock. The polymerization temperature was controlled at 70° C. by cooling, and the total pressure was kept constant by additional metered addition of ethylene. After a polymerization time of 1 hour, the reaction was stopped by the addition of isopropanol, and the reactor was let down and opened. Drying of the product gave 0.45 kg of free-flowing wax powder having a VN of 17 cm$^3$/g. The melt viscosity at 140° C. was 240 mPas.

Example 3

To prepare the catalyst, 4.2 mg of rac-dimethylsilyl-bis (indenyl) zirconium dichloride were dissolved in 20 cm$^3$ of methyleluminoxane solution in toluene (corresponding to 27 mmol of Al) and reacted with the methylaluminoxane by standing for 15 minutes. In parallel, a dry 16-dm$^3$ reactor flushed with nitrogen was filled with 2.5 kg of propane and 1.4 kg of propylene, and 1.5 bar of hydrogen were metered in at 30° C. 30 cm$^3$ of the methylaluminoxane solution in toluene were added via a pressure lock, the reactor contents were heated to 70° C. and stirred at 100 rpm. Polymerization was started at 250 rpm by addition of the catalyst via the pressure lock. The polymerization temperature was held at 70° C. by cooling. After a polymerization time of 1 hour, the reaction was stopped by addition of isopropanol, and the reactor was let down and opened. Drying of the product gave 0.45 kg of PP wax powder having a VN of 14 cm$^3$/g and a melting point (DSC) of 133° C. The DSC enthalpy of fusion was 95.7 J/g and the isotactic index was 87% by IR. The melt viscosity at 170° C. was 100 mPas.

Example 4

To prepare the catalyst, 4.9 mg of rac-ethylenebis (indenyl) zirconium dichloride were dissolved in 20 cm$^3$ of methylaluminoxane solution in toluene (corresponding to 27 mmol of Al) and reacted with the methylaluminoxane by standing for 15 minutes. In parallel, a dry 16-dm$^3$ reactor or flushed with nitrogen was filled with 2.5 kg of propane and 1 kg of propylene, and 1.5 bar of hydrogen and 5.5 bar of ethylene were metered in at 30° C. 30 cm$^3$ of the methylaluminoxane solution in toluene were added via a pressure lock, the reactor contents were heated to 70° C. and stirred at 100 rpm. Polymerization was started at 250 rpm by addition of the catalyst via the pressure lock. The polymerization temperature was controlled at 70° C. by cooling, and the total pressure was kept constant at 34 bar by metered addition of ethylene. After a polymerization time of 1 hour, the reaction was stopped by addition of isopropanol, and the reactor was let down and opened. Drying in vacuo of the product gave 2.70 kg of copolymer wax having a VN of 37 cm$^3$/g and a melting point (DSC) of 87° C. The DSC enthalpy of fusion was 70.4 J/g. The melt viscosity at 140° C. was 6100 mPas.

Example 5

Preparation of Supported Aluminoxane:

6 dm$^3$ of diesel oil free of aromatics (b.p. 100°–120° C.) were initially introduced under inert conditions into a 16-dm$^3$ stirred reactor, 0.60 dm$^3$ of trimethylaluminum (6.24 mol) were added, and the mixture was temperature-controlled at 25° C. 240 g of silica gel (®Aerosil R 812; Degussa AG), which previously had been dried at 120° C. in an argon fluidized bed were metered into this reactor via a powder funnel and homogeneously suspended by means of a stirrer and a recirculation system. The reactor contents were sucked in by the recirculation system via a connection at the reactor bottom by means of a pump, pushed into a mixer and returned from there to the reactor through an ascending pipe via a heat exchanger. The mixer was designed in such a manner that an increased flow rate was generated in the feed by means of a narrowed pipe cross-section into whose turbulence zone a thin feedline ran axially and against the direction of flow, through which line periodically a defined amount of water could be fed in each time under 40 bar of argon. A total of 92 g of water was metered into the mixer in portions of 0.1 cm³ every 15 seconds over a period of 4 hours. After addition of water at an internal temperature of the reactor of 25° C. was complete, the recirculation system was turned off, and the reactor contents were stirred at 25° C. for another 5 hours.

The supported aluminoxane thus prepared was used as a 12% suspension in diesel oil (b.p. 100°–120° C.). The aluminum content was 1.06 mmol of Al per cm³ of suspension. The isolated solid contained 31% by weight of Al. The suspending agent contained less than 0.1% by weight of aluminum.

Preparation of the Catalyst:

5 cm³ of the suspension of the supported aluminoxane were poured into a G3 Schlenk-type filter tube under argon and filtered off. The remaining solid was resuspended in 20 cm³ of an inert diesel oil free of aromatics (b.p. 100° to 120° C.). 2.5 cm³ of a 1/250-molar solution of bis(cyclopentadienyl) zirconium dichloride in absolute toluene were metered into this suspension, and the mixture was stirred at 30° C. for ¼ hour. The mixture was then filtered, the remaining solid washed with 20 cm³ of diesel oil and again resuspended in 20 cm³ of diesel oil for polymerization.

Polymerization:

In parallel, a dry 16-dm³ reactor flushed with nitrogen was filled with 4 kg of propane, and 2.5 bar of hydrogen and 4.5 bar of ethylene were metered in at 30° C. The reactor contents were heated to 70° C., 2 cm³ of a trimethylaluminum solution in toluene were added via the pressure lock, and the mixture was stirred at 100 rpm. Polymerization was started at 250 rpm by addition of the catalyst via the pressure lock. The polymerization temperature was controlled at 70° C. by cooling, and the total pressure was kept constant at 33.5 bar by metered addition of ethylene. After a polymerization time of 1 hour, the reaction was stopped by addition of isopropanol, and the reactor was let down and opened. Drying of the product gave 0.20 kg of wax powder having a VN of 4.0 cm/g. The DSC enthalpy of fusion was 209.5 J/g. GPC analysis showed an $M_w/M_n$ of 1.4 at an $M_w$ of 700 g/mole.

Example 6

7 mg of bis(methylcyclopentadienyl)zirconium dichloride were preactivated analogously to Example 1 in 20 cm³ of methylaluminoxane solution in toluene. The polymerization according to Example 1 was repeated using 0.5 bar of hydrogen, an ethylene partial pressure of 6 bar being continuously kept constant and 4 g/h of hydrogen being additionally metered in batchwise in 60 portions during the polymerization. The characteristic data are summarized in Table 1.

Examples 7 to 10

Example 6 was repeated, using 7 mg each of the metallocenes summarized in Table 1. The characteristic data are summarized in Table 1.

Preparation of Dimesitylsilylbis (Indenyl) Zirconium Dichloride 7 g of indene in 50 cm³ of THF were reacted with 24 cm³ of butyllithium (2.5-molar in hexane) at 0° C. under inert conditions. The mixture was heated to room temperature, added dropwise to a solution of 10 g of dimesityldichlorosilane in 40 cm³ of THF, and the mixture was refluxed for 4 hours. Decomposition of the batch with water, extraction with diethyl ether and chromatography on SiO₂ using 2:1 toluene/hexane gave 3.28 g of dimesitylbis (indenyl)silane as a solid. MS(m/e,I rel %): 496 (100, M⁺); ¹H NMR in CDCl₃: 2.22 ppm (12 H, s), 2.27 ppm (6 H, s), 3.40 ppm (4 H, s), 6.8–7.4 ppm (14 H, m).

The solid was dissolved in diethyl ether, and 5.8 cm³ of butyllithium (2.5-molar in hexane) were slowly added at 0° C. After stirring at room temperature for 1 hour and concentration of the suspension, the lithium salt was filtered off and washed with hexane. 1.54 g of zirconium tetrachloride were mixed with 50 cm³ of methylene chloride, the mixture was cooled to −78° C., and the isolated lithium salt was added with stirring. The batch was stirred at −20° C. for 2 hours, then heated to room temperature, and the solvent was removed. Extraction with toluene/THF and washing with hexane gave 3.8 g of di-mesitylsilylbis(indenyl)zirconium dichloride having a rac/meso ratio of 3:1. ¹H NMR in CDCl₃: 2.25 ppm (meso 6 H, s), 2.35 ppm (meso 12 H, s), 2.68 ppm (rac 6 H, s), 2.78 ppm (rac 12 H, 2), 6.0 ppm (meso, 2 H, d), 6.08 ppm (rac, 2 H, d), 6.50–7.65 ppm (14 H, m).

Example 11

7 mg of bis(indenyl)zirconium dichloride were preactivated analogously to Example 1.

In parallel, a dry 16-dm³ reactor flushed with nitrogen was filled with 5 kg of propane and 160 g of propylene. 30 cm³ of methylaluminoxane solution in toluene were added via a pressure lock, the reactor was heated to 70° C., the contents were stirred at 250 rpm, and 0.5 bar of hydrogen and 4 bar of ethylene were metered in. Polymerization was started by addition of the catalyst via the pressure lock. The polymerization temperature was controlled at 70° C. by cooling, the total pressure was kept constant at 32 bar by metered addition of ethylene, and hydrogen was added batchwise in 60 steps at 4 g/h. After a reaction time of 1 hour, polymerization was stopped by addition of isopropanol, and the reactor was let down and opened. Drying of the product in vacuo gave 1.1 kg of copolymer wax having a VN of 18 cm³/g, a melting point (DSC) of 120° C. The DSC enthalpy of fusion was 243 J/g. The melt viscosity at 140° C. was 258 mPaxs. (Table 2).

Example 12

Example 11 was repeated, except that the same molar amount of a methylisobutylaluminoxane solution in heptane was used instead of the methylaluminoxane solution in toluene for activating the metallocene and for initial introduction into the reactor. This 10% by weight heptane solution was prepared in accordance with Example 7 of EP 442,300. GC analysis of the gases the gases formed by complete hydrolysis of a sample gave 12.5 mol % of i-butane and 87.5 mol % of methane.

Polymerization gave 650 g of copolymer having a VN of 11 cm³/g and a DSC melting point of 117° C. (Table 2).

Example 13

6.25 mg of bis(indenyl)zirconium dichloride were used as in Example 5 for the preparation of the catalyst on supported aluminoxane and then used for copolymerization analogously to Example 11, no further methylaluminoxane being added and, instead, 5 mmol of triisobutylaluminum in heptane being introduced into the reactor. Polymerization gave 1.0 kg of copolymer having a VN of 25 cm³/g and a DSC melting point of 116.2° C. (Table 2).

Examples 14 and 15

Example 11 was repeated using 7 mg of bis (methylcyclopentadienyl)zirconium dichloride and 6 mg of bis(n-5 butylcyclopentadienyl)zirconium dichloride, respectively. The results are summarized in Table 2.

Examples 16 to 18

Example 11 was repeated, increasing Mounts of propylene being initially introduced. The results are summarized in Table 2. According to ¹³C NMR, the product from Example 18 contained 7.5 mol % of propylene at a crystallinity, calculated from the heat of fusion, of about 53%. The product was obtained as a non-agglomerated powder, and the reactor was free of deposits. Even such low-crystal-line products remained undissolved in propane.

Examples 19 to 26

Example 11 was repeated, initially introducing the amount and type of a different comonomer (1-hexene, 1-butene, 4-methyl-1-pentene) given in Table 3 as a liquid instead of propylene. Polymerization was then started using about 7 mg of the metallocene given in Table 3. The resulting waxes were solid powders having a bulk density of 300 to over 400 g/dm³. The catalyst yields and the analytical data of the experiments are summarized in Table 3.

Example 27

Analogously to Example 11, 6.5 mg of catalyst A were preactivated, and the reactor was prepared pouring in 89 cm³ of propylene and additionally 160 cm³ of 4-methyl-1-pentene. Polymerization was then carried out at 70° C. as in Example 11. The terpolymer wax formed after 1 hour had a VN of 21.3 cm³/g, a melting point of 114.6° C., a heat of fusion of 185 J/g and a bulk density of 485 g/dm³. ¹³C NMR showed an incorporation of 3.6 mol % of propylene and 0.2 mol % of 4-methyl-1-pentene. The catalyst yield was 71 kg/mmol of Zr.

TABLE 1

| Ex. | Cat. | CY | VN | $M_v$ | $T_m$ | $H_f$ |
|---|---|---|---|---|---|---|
| 6 | A | 32.6 | 33 | 1320 | 130 | 280 |
| 7 | B | 36 | 23 | 1150 | 128 | 279 |
| 8 | C | 33 | 32 | 3090 | 129 | 278 |
| 9 | D | 40 | 45 | 13084 | 130 | 271 |
| 10 | E | 28 | 29 | 2040 | 129 | 275 |

TABLE 2

| Ex. | Cat. | g of $C_3$ | CY | VN | mol % of $C_3$ | Mv | $T_m$ | $H_f$ |
|---|---|---|---|---|---|---|---|---|
| 11 | F | 160 | 57.7 | 18 | 1.9 | 258 | 120 | 243 |
| 12 | F | 160 | 32 | 11 | 3.0 | 68 | 117 | 231 |
| 13 | G | 160 | 73 | 25 | 3.3 | 1090 | 116 | 215 |
| 14 | A | 160 | 38 | 23 | 1.0 | 965 | 124 | 236 |
| 15 | B | 160 | 56 | 24 | 1.5 | 840 | 123 | 237 |
| 16 | F | 250 | 74 | 22 | 3.2 | 700 | 117 | 206 |

TABLE 2-continued

| Ex. | Cat. | g of $C_3$ | CY | VN | mol % of $C_3$ | Mv | $T_m$ | $H_f$ |
|---|---|---|---|---|---|---|---|---|
| 17 | F | 375 | 40 | 14 | 4.8 | 170 | 112 | 195 |
| 18 | F | 500 | 18 | 11 | 7.5 | 90 | 106 | 155 |

TABLE 3

| Ex. | Cat. | Comonomer cm³ | CY | VN | mol % | Mv | $T_m$ | $H_f$ |
|---|---|---|---|---|---|---|---|---|
| 19 | H | 150 C₆ | 31.5 | 40 | 1.46 | 8000 | 125 | 161 |
| 20 | H | 350 C₆ | 46.8 | 38 | 3.2 | 6400 | 115.4 | 122 |
| 21 | B | 300 C₆ | 54 | 18.1 | 0.8 | 300 | 123 | 232 |
| 22 | A | 680 C₆ | 51 | 21.3 | 1.5 | 550 | 121 | 206 |
| 23 | H | 300 C₄ | 53 | 35 | 3.1 | 4600 | 117 | 162 |
| 24 | B | 600 C₄ | 49 | 22 | 1.6 | 650 | 120.5 | 192 |
| 25 | H | 300 4M1P | 24.2 | 47 | 2.2 | 15700 | 117.9 | 156 |
| 26 | B | 700 4M1P | 49 | 20.7 | 0.9 | 490 | 125 | 228 |

Legend for Tables 1 to 3
Catalysts:
A: bis(methylcyclopentadienyl)zirconium dichloride,
B: bis(n-butylcyclopentadienyl)zirconium dichloride,
C: bis(1,2,4-trimethylcyclopentadienyl)zirconium dichloride,
D: dimesitylsilylbis(indenyl)zirconium dichloride,
E: bis(tetrahydroindenyl)zirconium dichloride,
F: bis(indenyl)zirconium dichloride,
G: bis(indenyl)zirconium dichloride on a MAO/SiO₂ support,
H: ethylenebis(1-indenyl)zirconium dichloride;
Comonomer: C6: 1-hexene, C4: 1-butene, 4M1P: 4-methyl-1-pentene;
CY: kg of wax/mmol of Zr;
VN: viscosity number [cm³/g];
mol % of C3: mol % of propylene according to ¹³C NMR;
Mv: melt viscosity [mPas] at 140° C.;
$T_m$: melting point [°C.] by DSC;
$H_f$: heat of fusion [J/g] by DSC

We claim:

1. A process for the preparation of a polyolefin wax by polymerization or copolymerization of olefins or diolefins at a temperature in the range of −40° to 95° C., at a pressure in the range of 0.5 to 120 bar, in a suspension in the presence of a catalyst comprising a metallocene and a cocatalyst selected from the group consisting of an organoaluminum compound, $R^{22}NH_{4-x}BR^{23}_4$, $R^{22}_xPH_{4-x}BR^{23}_4$, $R^{22}_3CBR^{23}_4$; or $BR^{23}_3$ where x is a number from 1 to 4, the radicals $R^{22}$ are identical or different, and are $C_1$–$C_{10}$alkyl or $C_8$–$C_{18}$-aryl, or two radicals $R^{22}$, together with the atom linking them, form a ring, and the radicals $R^{23}$ are identical or different, and are an unsubstituted or substituted $C_6$–$C_{18}$-aryl wherein the substituents are selected from the group consisting of alkyl, haloalkyl and fluorine, and wherein the metallocene is a compound of the formula I

in which $M^1$ is a metal of group IVb, Vb or VIb of the Periodic Table of Elements, $R^1$ and $R^2$ are identical or different and are a hydrogen atom, a $C_1$–$C_{10}$-alkyl group, a $C_1$–$C_{10}$-alkoxy group, $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom and $R^3$ and $R^4$ are identical or different end are a mononuclear or polynuclear hydrocarbon radial capable of forming a sandwich structure with the central atom $M^1$, or one of the radials $R^3$ and $R^4$ is a substituted nitrogen atom and hydrocarbons having 3 carbon atoms or a halogenated hydrocarbon which boils at a temperature not higher than 95° C. serve as suspending agents.

2. The process as claimed in claim 1, wherein the metallocene is a compound of the formula Ia

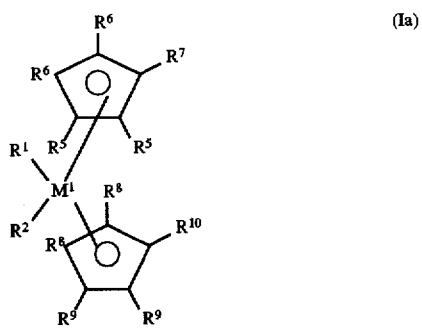

in which $R^1$ and $R^2$ have the meaning given in claim 1 and $R^5$, $R^6$, $R^7$, $R^8$, $R^9$ and $R^{10}$ are identical or different and are a hydrogen atom, a halogen atom, a $C_1$–$C_{10}$-alkyl group, a $C_6$–$C_{10}$-aryl group, a $C_1$–$C_{10}$-alkoxy group or a —$NR^{16}{}_2$, —$SR^{16}$, —$OSiR^{16}{}_3$, —$SiR^{16}{}_3$ or —$PR^{16}{}_2$ radical, in which $R^{16}$ is a $C_1$–$C_{10}$-alkyl group or a $C_6$–$C_{10}$-aryl group, or, in the case of Si- or P-containing radicals, is also a halogen atom, or any two adjacent radicals $R^5$, $R^6$, $R^7$, $R^8$, $R^9$ or $R^{10}$ together with the carbon atoms linking them form a ring.

3. The process as claimed in claim 1, wherein the metallocene is a compound of the formula Ib

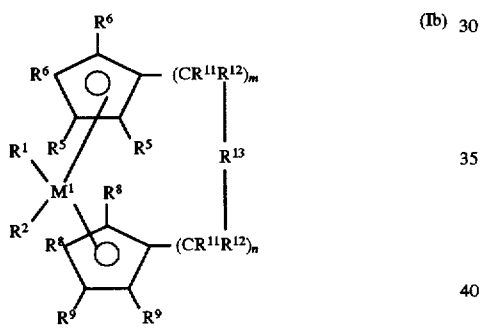

in which $R^1$ and $R^2$ have the meaning given in claim 1, $R^5$, $R^6$, $R^8$, $R^9$ and $R^{16}$ have the meaning given in claim 2, $R^{13}$ is

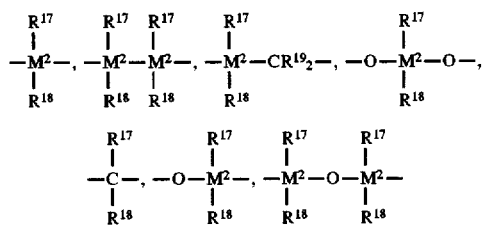

=$BR^{17}$, —$AR^{17}$, —Ge—, —Sn—, —O—, —S—, =SO, =$SO_2$, =$NR^{17}$, =CO, =$PR^{17}$ or =$P(O)R^{17}$, in which $R^{17}$, $R^{18}$ and $R^{19}$ are identical or different and are a hydrogen atom, a halogen atom, a $C_1$–$C_{30}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{17}$ and $R^{18}$ or $R^{17}$ and $R^{19}$ in each case together with the atoms linking them form a ring, $M^2$ is silicon, germanium tin, and $R^{11}$ and $R^{12}$ are identical or different and have the meaning given for $R^{17}$, m and n are identical or different and are zero, 1 or 2, m plus n being zero, 1 or 2, preferably zero or 1.

4. The process as claimed in claim 1, wherein the metallocene is a compound of the formula Ic

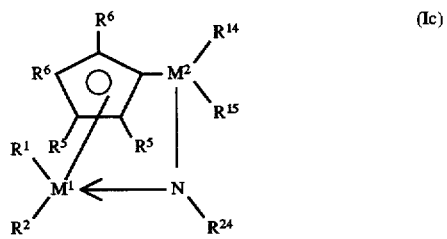

in which $R^1$ and $R^2$ have the meaning given in claim 1, $R^5$ and $R^6$ have the meaning given in claim 2, $M^2$ has the meaning given in claim 3, $R^{14}$ and $R^{15}$ have the meaning of $R^{17}$ and $R^{18}$, and $R^{24}$ has the meaning of $R^{17}$.

5. The process as claimed in claim 1, wherein the co-catalyst is an aluminoxane of the formula IIa or of the formula IIb or a mixture thereof

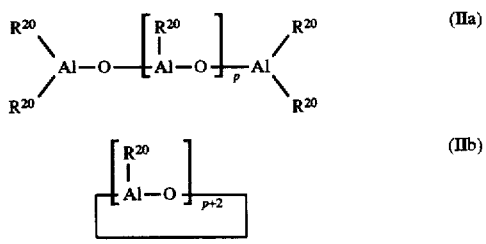

in which the $R^{20}$ radicals are identical or different $C_1$–$C_6$-alkyl groups and p is an integer of from 4 to 30.

6. The process as claimed in claim 1, wherein the suspending agent is propane.

7. The process as claimed in claim 1, wherein a catalyst is used which is present on a support material.

8. The process as claimed in claim 1, wherein ethylene, propylene, 1-butene, 4-methyl-1-pentene or hexene are polymerized.

9. A process for the preparation of a polyolefin wax as claimed in claim 1, wherein $M^1$ is zirconium.

10. A process for the preparation of a polyolefin wax as claimed in claim 1, wherein $M^1$ is titanium.

11. A process for the preparation of a polyolefin wax as claimed in claim 1, wherein $M^1$ is hafnium.

12. The process for the preparation of a polyolefin wax as claimed in claim 1, wherein $M^1$ is a metal from Group IVb of the periodic table.

* * * * *